(12) United States Patent
Sobanski et al.

(10) Patent No.: US 12,510,030 B2
(45) Date of Patent: Dec. 30, 2025

(54) AFT MOUNTED PUSHER FAN FOR GAS TURBINE ENGINE

(71) Applicant: RTX Corporation, Farmington, CT (US)

(72) Inventors: Jon Erik Sobanski, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/646,941

(22) Filed: Apr. 26, 2024

(65) Prior Publication Data

US 2024/0295194 A1 Sep. 5, 2024

Related U.S. Application Data

(63) Continuation of application No. 18/088,122, filed on Dec. 23, 2022, now Pat. No. 12,018,620.

(51) Int. Cl.
  *F02C 7/36* (2006.01)
  *F02C 3/06* (2006.01)
  (Continued)

(52) U.S. Cl.
  CPC ............ *F02C 7/36* (2013.01); *F02C 3/06* (2013.01); *F02K 3/04* (2013.01); *F05D 2220/323* (2013.01); *F05D 2240/62* (2013.01)

(58) Field of Classification Search
  CPC ........ B64D 27/14; B64D 27/20; B64D 27/12; B64D 2033/0273; B64D 27/08; B64D 2241/00; B64D 2027/262; B64D 29/06; B64D 33/02; B64D 27/10; B64D 2033/0286; B64D 27/02; B64D 27/16; B64D 27/18; B64D 35/00; B64D 41/00; B64D 2033/0293; B64D 29/00; B64D 29/02; F05D 2220/323; F05D 2220/36;
  (Continued)

(56) References Cited

U.S. PATENT DOCUMENTS 3,381,475 A 5/1968 Roberts
4,817,382 A 4/1989 Rudolph et al.
(Continued)

OTHER PUBLICATIONS

European Search Report for EP Application No. 23218820.1 dated Apr. 26, 2024.

*Primary Examiner* — Eric J Zamora Alvarez
(74) *Attorney, Agent, or Firm* — Carlson, Gaskey & Olds, P.C.

(57) ABSTRACT

A fan drive turbine drives a drive shaft. A compressor section and a turbine section rotate about a rotational axis, with the turbine section positioned in a downstream direction. A fan has fan blades and a fan hub positioned radially within a fan case, with the fan case defining a bypass duct. A fan inlet guide vane case is upstream of the fan blades and a fan exit guide vane case is mounted downstream. The drive shaft is mounted on at least one input drive shaft bearing inwardly of the fan inlet guide vane case. The drive shaft drives a flexible coupling to in turn drive a gear reduction. The gear reduction drives a fan drive shaft to in turn drive the fan hub. At least two fan drive shaft bearings support the fan drive shaft within the fan exit guide vane case. An aircraft is also disclosed.

14 Claims, 6 Drawing Sheets

(51) Int. Cl.
*F02C 3/10* (2006.01)
*F02K 3/04* (2006.01)
*F02K 3/062* (2006.01)

(58) Field of Classification Search
CPC ........... F05D 2220/326; F05D 2240/62; F05D 2260/40311; F02C 7/36; F02C 3/06; F02C 3/10; F02K 3/04; F02K 3/062; B64C 11/001; F01D 13/003; F01D 13/02; F01D 13/00; F01D 25/162; F04D 29/325; F04D 29/056
See application file for complete search history.

(56) References Cited

U.S. PATENT DOCUMENTS

| | | |
|---|---|---|
| 5,161,369 A | 11/1992 | Williams |
| 8,701,385 B2 | 4/2014 | Clemen |
| 8,876,462 B2 | 11/2014 | Balk et al. |
| 10,287,024 B2 | 5/2019 | Suciu et al. |
| 10,392,119 B2 | 8/2019 | Niergarth et al. |
| 10,421,553 B2 | 9/2019 | Suciu et al. |
| 10,465,549 B2 | 11/2019 | Munsell et al. |
| 10,556,666 B2 | 2/2020 | Sclafani et al. |
| 10,711,631 B2 | 7/2020 | Suciu et al. |
| 10,723,470 B2 | 7/2020 | Suciu et al. |
| 2009/0071121 A1 | 3/2009 | Suciu et al. |
| 2009/0090096 A1 | 4/2009 | Sheridan |
| 2022/0136441 A1* | 5/2022 | Malecki ................. B64D 29/08 60/796 |

* cited by examiner

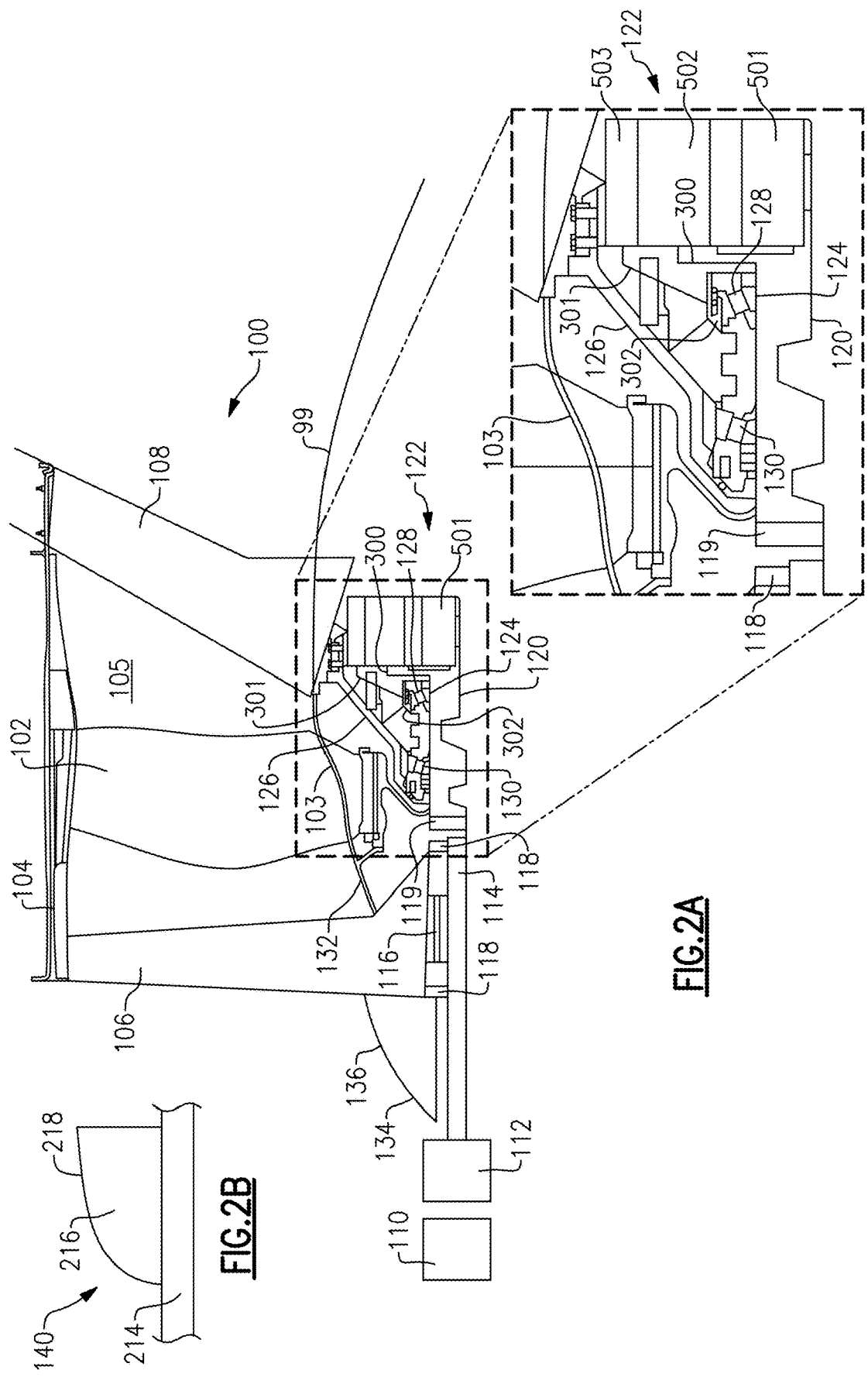

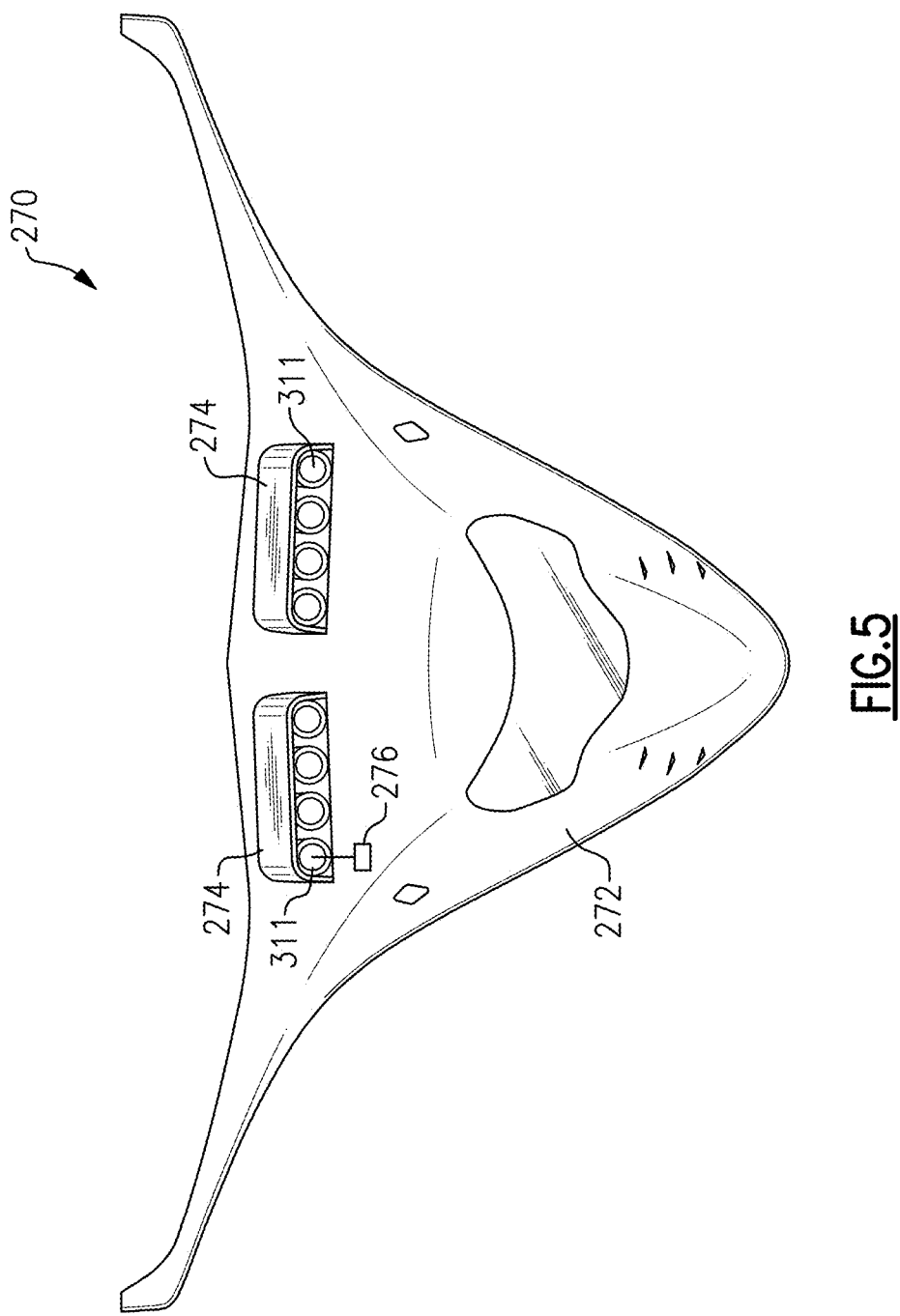

AFT MOUNTED PUSHER FAN FOR GAS TURBINE ENGINE

CROSS-REFERENCE TO RELATED APPLICATIONS

This application is a continuation of U.S. patent application Ser. No. 18/088,122 filed Dec. 23, 2022.

BACKGROUND OF THE INVENTION

This application relates to an aft mounted pusher fan incorporated into a gas turbine engine.

Gas turbine engines are known, and typically include a fan mounted at a forward end that delivers air into a bypass duct as propulsion air. The air is also delivered from the fan into a compressor. Compressed air then passes into a combustor where it is mixed with fuel and ignited. Products of this combustion pass downstream over turbine rotors, driving them to rotate. The turbine rotors in turn rotate fan and compressor rotors.

Historically the fan rotor and the low pressure compressor have been driven by a low pressure turbine at the same speed. This has limitations for several reasons. As an example, it would be desirable for the fan to rotate more slowly than a fan drive turbine, and for a low pressure compressor to rotate more quickly than the fan. Thus, recently, a gear reduction has been incorporated between the low pressure compressor and the fan rotor. This allows the fan rotor to rotate slower than the fan drive turbine, and results in efficiency.

As the gear reduction was incorporated into the gas turbine engine, an outer diameter of the fan rotor increased, to enable increased thrust production. This has resulted in packaging challenges with regard to several types of mount locations for the gas turbine engine, such as, for example mount locations on aircraft.

SUMMARY OF THE INVENTION

In a featured embodiment, a gas turbine engine includes a compressor section, a combustor and a turbine section defining a core engine. A fan drive turbine drives a drive shaft. The compressor section and the turbine section rotate about a rotational axis, with the turbine section positioned in a downstream direction relative to the compressor section. A fan has fan blades and a fan hub positioned radially within a fan case, with the fan case defining a bypass duct. A fan inlet guide vane case is upstream of the fan blades and a fan exit guide vane case is mounted downstream of the fan blades. The drive shaft is mounted on at least one input drive shaft bearing inwardly of the fan inlet guide vane case. The drive shaft drives a flexible coupling to in turn drive a gear reduction. The gear reduction drives a fan drive shaft to in turn drive the fan hub. At least two fan drive shaft bearings support the fan drive shaft and are mounted within the fan exit guide vane case.

In another embodiment according to the previous embodiment, the gear reduction is mounted aft of the fan drive shaft.

In another embodiment according to any of the previous embodiments, drive shaft oil seals are positioned within the fan inlet guide vane case on each axial side of the at least one input drive shaft bearing.

In another embodiment according to any of the previous embodiments, a fan shaft oil seal is positioned between the fan drive shaft and the flex coupling.

In another embodiment according to any of the previous embodiments, the fan drive shaft is mounted radially outwardly of the flex coupling.

In another embodiment according to any of the previous embodiments, there is a static inner fairing intermediate the fan inlet guide vane case and the fan hub.

In another embodiment according to any of the previous embodiments, there is an upstream fairing positioned forward of the fan inlet guide vane case.

In another embodiment according to any of the previous embodiments, the upstream fairing is fixed to the fan inlet guide vane case and has a curved outer surface to guide air approaching the fan inlet guide vane case.

In another embodiment according to any of the previous embodiments, the upstream fairing is fixed to rotate with the drive shaft and has a curved outer surface to direct the air toward the fan inlet guide vane case.

In another featured embodiment, an aircraft includes an aircraft body mounting at least two gas turbine engines. Each the gas turbine engine has a compressor section, a combustor and a turbine section defining a core engine. A fan drive turbine drives a drive shaft. The compressor section and the turbine section rotate about a rotational axis, with the turbine section positioned in a downstream direction relative to the compressor section. A fan has fan blades and a fan hub positioned radially within a fan case, with the fan case defining a bypass duct. A fan inlet guide vane case is upstream of the fan blades and a fan exit guide vane case is mounted downstream of the fan blades. The drive shaft is mounted on at least one input drive shaft bearing inwardly of the fan inlet guide vane case. The drive shaft drives a flexible coupling to in turn drive a gear reduction. The gear reduction drives a fan drive shaft to in turn drive the fan hub. At least two fan drive shaft bearings support the fan drive shaft and are mounted within the fan exit guide vane case.

In another embodiment according to any of the previous embodiments, the gear reduction is mounted aft of the fan drive shaft.

In another embodiment according to any of the previous embodiments, drive shaft oil seals are positioned within the fan inlet guide vane case on each axial side of the at least one input drive shaft bearing, and a fan shaft oil seal is positioned between the fan drive shaft and the flex coupling.

In another embodiment according to any of the previous embodiments, the fan drive shaft is mounted radially outwardly of the flex coupling.

In another embodiment according to any of the previous embodiments, an upstream fairing is fixed to the fan inlet guide vane case and has a curved outer surface to guide air approaching the fan inlet guide vane case.

In another embodiment according to any of the previous embodiments, an upstream fairing is fixed to rotate with the drive shaft and has a curved outer surface to direct the air toward the fan inlet guide vane case.

In another embodiment according to any of the previous embodiments, the aircraft has a pair of wings and one of the gas turbine engines is mounted vertically above each of the wings.

In another embodiment according to any of the previous embodiments, the aircraft has a pair of wings with struts extending from a central fuselage to an underside of the wings, and one of the gas turbine engines is mounted beneath each of the wings.

In another embodiment according to any of the previous embodiments, the aircraft has a fuselage with wings merging outwardly of the central fuselage and there is a plurality of the gas turbine engines mounted in each of two lateral sides of the fuselage.

In another embodiment according to any of the previous embodiments, the fan drive turbines are positioned forward of the fans in the gas turbine engines.

In another embodiment according to any of the previous embodiments, the fan drive turbine is spaced axially from the core engine and separate from the core engine.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2A shows a fan that might replace the fan of the FIG. 1 engine.

FIG. 2B shows an alternative embodiment to the FIG. 2A engine.

FIG. 5 shows yet another aircraft type which could beneficially incorporate engines such as shown in FIG. 2A.

DETAILED DESCRIPTION

Figure 1:
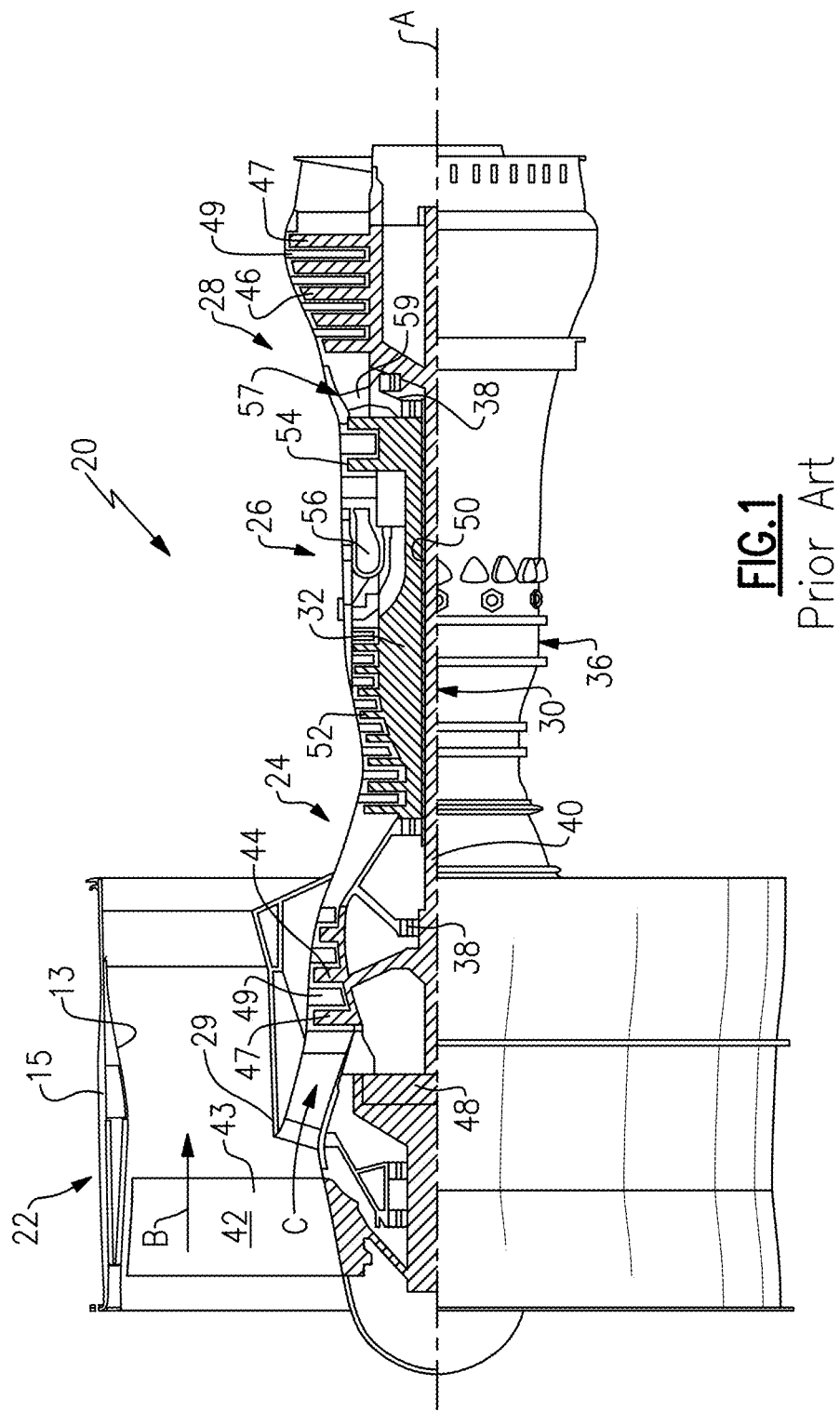
FIG. 1 schematically shows a prior art gas turbine engine.

FIG. 1 schematically illustrates a gas turbine engine 20. As used herein, a gas turbine engine 20 can include a turbine engine powered by a fuel (e.g., petroleum-based fuel, liquid hydrogen, or the like). The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 24.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 130, such as between 50.0 and 70.0 or between 80 and 120. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

The above describes the operation of a gas turbine engine. This disclosure is directed to an engine which differs from the FIG. 1 in that the fan is moved to an aft location in the engine. Thus, air is delivered directly into the compressor section at the forward end, and a bypass duct is moved to the rearward end of the engine.

FIG. 2A shows an engine 100 incorporating fan blades 102 rotating with a fan hub 103. A fan case 104 is positioned outwardly of the blades 102 and defines a bypass duct 105. A fan inlet guide vane case 106 includes a plurality of circumferentially spaced airfoils directing the air approaching the fan blades 102 in a desired direction. A fan exit guide vane case 108 is positioned downstream of the fan blades 102.

A core engine 110 is shown schematically, and may incorporate a low and high pressure compressor, a low and high pressure turbine, and an intermediate combustor. A fan drive turbine 112 is shown separate from the core engine 110 and downstream of the low pressure turbine in the core engine 110. The fan drive turbine 112 drives a shaft 114.

The shaft 114 is mounted in a roller bearing 116 within the fan inlet guide vane case 106. Oil seals 118 are positioned on each side of the roller bearing 116. A lubricant supply (not shown) supplies lubricant to the roller bearing 116, and the oil seals 118 restrict leakage of that lubricant outwardly of a bearing case.

The shaft 114 drives a flex coupling 120 which in turn drives a gear reduction 122. In embodiments the gear reduction 122 may be an epicyclic gear reduction, as described below. The gear reduction 122 drives a fan drive shaft 124 that in turn drives the fan hub 103 to rotate the fan blades 102.

As can be seen in this Figure, the flex coupling 120 drives a sun gear 501. The sun gear 501 in turn drives intermediate gears 502 along with a carrier, as known. The carrier has an output shaft 300 that drives the fan drive shaft 124. A ring gear 503 surrounds the intermediate gears and carrier 502. As shown at 301, the ring gear is static and fixed to static structure 302.

This disclosure also extends to gear reductions where the carrier is static and the ring gear drives the fan drive shaft.

It could be said that the flex coupling 120 extends rearwardly of the fan blades 102, and to the gear reduction 122. The output 300 of the gear reduction then extends in a forward direction to the fan drive shaft 124. A fan shaft oil seal 119 is positioned between the fan drive shaft 114 and flex coupling 120.

The bearings, oil seals, flex couplings and gear reductions are all mounted efficiently and in a relatively compact space. The result is efficient packaging of relatively complex structures.

As can also be seen, the fan drive shaft 124 is mounted radially outwardly of the flex drive coupling 120.

Bearings 128 and 130 are shown supporting the fan drive shaft 124, and are in fan exit guide vane casing 126. Bearings 128/130 are tapered roller bearings. Alternatively, bearing arrangements having a ball and roller bearing, or two ball bearings can be used.

The fan has been moved to the aft end of the engine, and will provide a better location for the fan for certain aircraft body types.

A fairing 134 has a curved outer surface 136 that guides air toward the fan inlet guide vanes 106. A static fairing 132 is positioned downstream of the inlet guide vane case 106 and upstream of the fan rotor 103. Fairings 132 may also rotate in some embodiments.

In the illustrative embodiment of FIG. 2A, the fairing 134 is static and fixed to the fan inlet guide case 106.

FIG. 2B shows an alternative embodiment 140 of a fairing 216, such as fairing 134. Here, the shaft 214 rotates with the fairing 216 which has the curved outer surface 218. The rotation of the fairing 216 will desirably import pre-swirl to the air approaching the fan inlet guide vane case 106.

The rotation of fairing 216 may be counter or co-rotating with the fan depending on the type of gear reduction utilized. If a planetary gear reduction is utilized there would be a pre-swirl benefit. If a star gear reduction is utilized the static fairing may be most preferable.

Figure 2C:
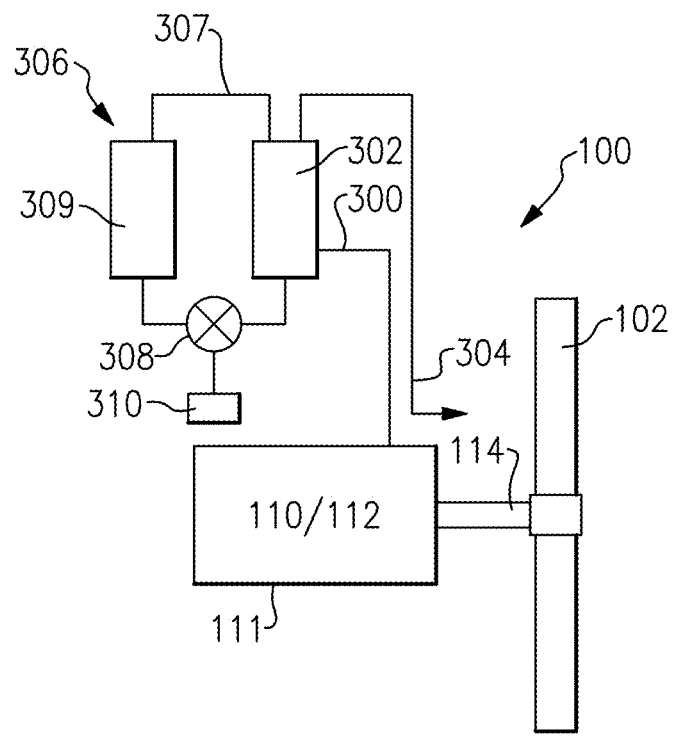
FIG. 2C shows a detail of a core exhaust.

FIG. 2C shows features of the exhaust from the core engine 110 and fan drive turbine 112. As shown, they are housed within a housing 111. The exhaust is tapped at 300 and passed through a heat exchanger 302 where the exhaust is cooled and then exits at 304 and approaches the fan rotor 102. The heat exchanger 302 may be provided with a bottoming cycle 306 which circulates a bottom cycle fluid through line 307 to cool the products of combustion in the heat exchanger 302. That bottom cycle fluid is then heated and passes across a turbine 308.

The turbine 308 is driven to rotate, and may power a generator such as shown at 310. The bottom cycle fluid then passes into a heat exchanger where it is cooled in some manner and then returned to the heat exchanger 302.

Figure 2D:
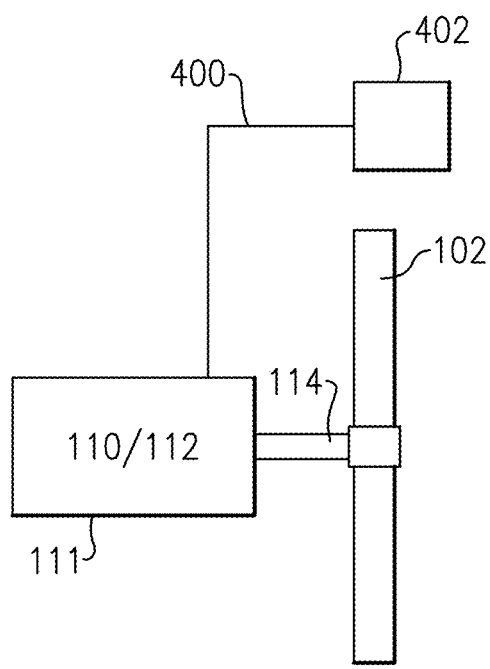
FIG. 2D shows an alternative exhaust.

FIG. 2D shows an alternative 400 wherein the exhaust is simply tapped from the core engine housing 111 and passed to an outlet 402 away from the fan inlet, and preferably independent of the fan flow. It should be understood that both FIGS. 2C and 2D are illustrated schematically.

The engine 100 is particularly beneficial for use in certain types of aircraft.

Figure 3A:
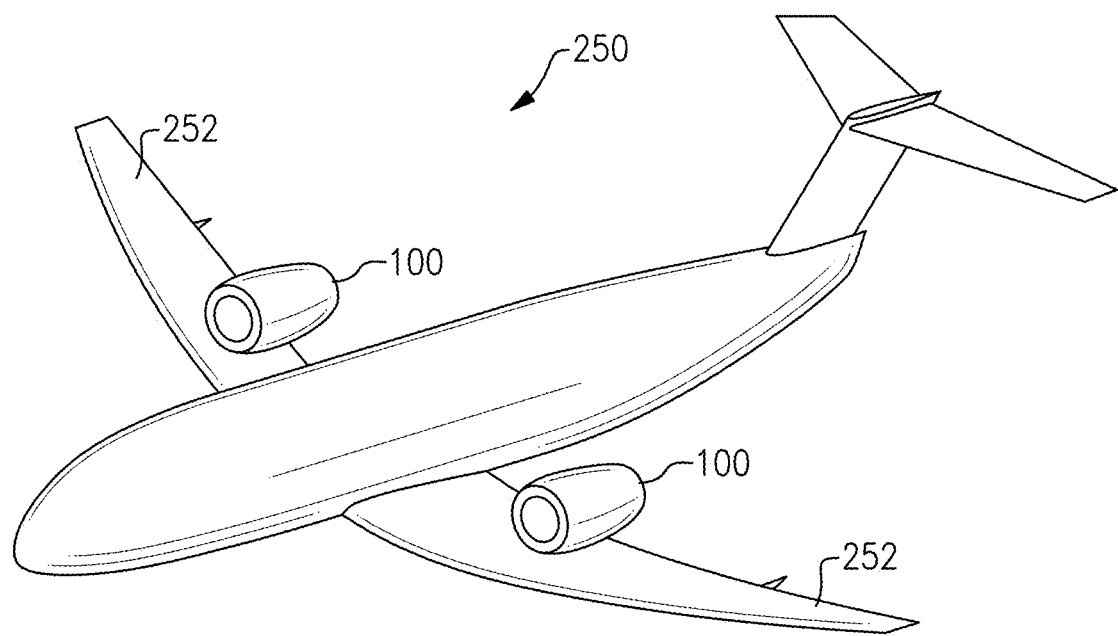
FIG. 3A shows a first aircraft mounting engine such as shown in FIG. 2A.

As an example, FIG. 3A shows an aircraft embodiment 250 wherein the engines 100 are mounted above the wings 252. The aft mounted fans will be beneficial to such an aircraft engine mount.

Figure 3B:
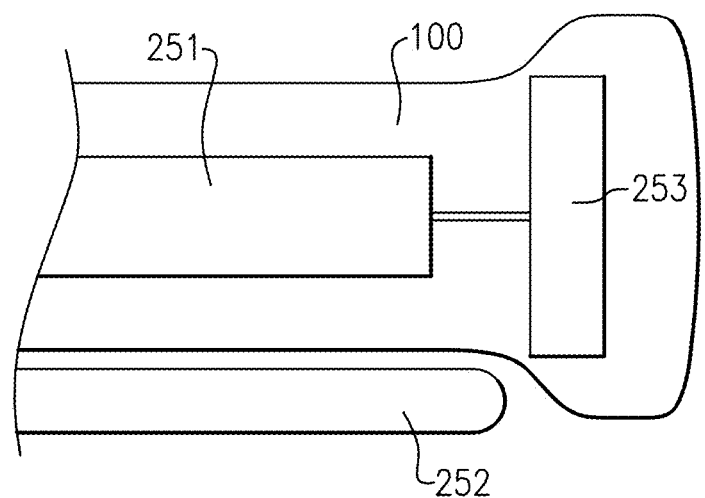
FIG. 3B schematically shows a feature of the FIG. 3A aircraft embodiment.

Aft mounted fans are especially efficient for offset or disconnected gas generator concepts. These types of configurations can have large bypass ratios. By mounting the fan in the aft there is no need for core flow reversal, which improves efficiency. For underwing mounted fans, the diameters are limited by wing to ground clearance. In an over wing nacelle configuration such as shown in FIGS. 3A and 3B, the fan can be at any desired location. As an example, as shown in FIG. 3B, the core engine 251 is forward of the fan 253, and the fan 253 may actually be rearward of the aft end of the wing 252.

Also, by having the core in front of the fan there is no longer a packaging constraint that the fan drive shaft must be within the core. A larger diameter potentially shorter power shaft could be a more dynamically stable alternative to the prior art.

Figure 4:
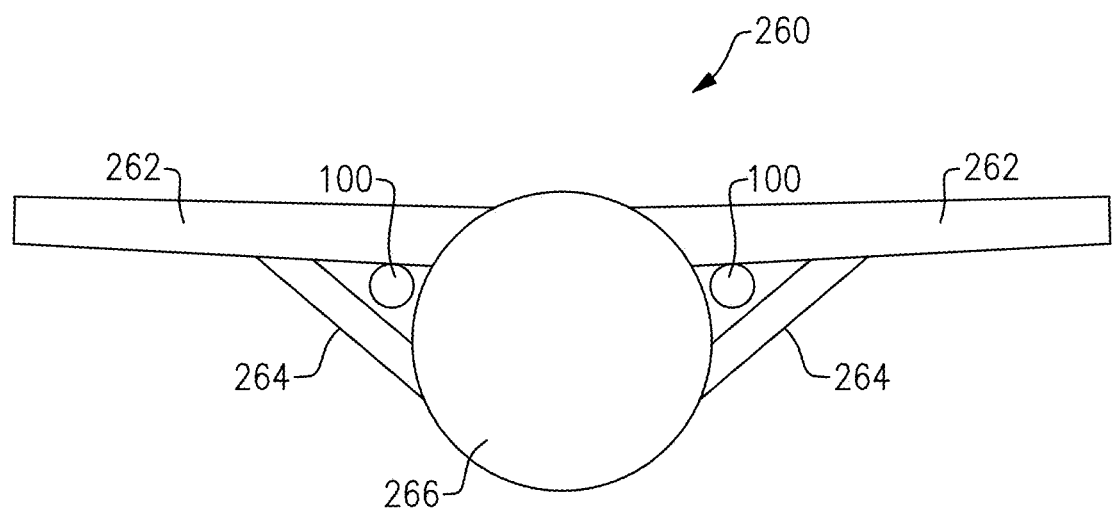
FIG. 4 shows a second aircraft type which might beneficially utilize engines such as shown in FIG. 2A.

FIG. 4 shows an aircraft 260 with strut mounted wings. Wings 262 are supported by struts 264 from a fuselage 266. Here again, the aft mounted fans and the engine 100 will particularly be beneficial in this arrangement. In a strut braced wing configuration, the wing is moved upwardly away from the ground. This will allow larger fans to fit in an underwing configuration. This extra design space allows the fan to fit at the aft end of the nacelle, with benefits as listed above.

FIG. 5 shows a distributed fan location in an aircraft 270. The fuselage 272 is smooth and has wings which merge outwardly of the fuselage rather than distinct wings. Grouped or distributed fans 274 include a plurality of fan members 311 which may be driven by fan drive turbine 276 (only one of which is shown) which are positioned in a forward direction relative to the fans 311.

A gas turbine engine under this disclosure could be said to include a compressor section, a combustor and a turbine section defining a core engine. A fan drive turbine drives a drive shaft. The compressor section and the turbine section rotate about a rotational axis, with the turbine section positioned in a downstream direction relative to the compressor section. A fan has fan blades and a fan hub positioned radially within a fan case. The fan case defines a bypass duct. A fan inlet guide vane case is upstream of the fan blades and a fan exit guide vane case is mounted downstream of the fan blades. The drive shaft is mounted on at least one input drive shaft bearing inwardly of the fan inlet guide vane case. The drive shaft drives a flexible coupling to in turn drive a gear reduction. The gear reduction drives a fan drive shaft to in turn drive the fan hub. At least two fan drive shaft bearings support the fan drive shaft and are mounted within the fan exit guide vane case.

An aircraft under this disclosure could be said to include an aircraft body mounting at least two gas turbine engines. Each gas turbine engine has a compressor section, a combustor and a turbine section defining a core engine. A fan drive turbine drives a drive shaft. The compressor section and the turbine section rotate about a rotational axis, with the turbine section positioned in a downstream direction relative to the compressor section. A fan has fan blades and a fan hub positioned radially within a fan case. The fan case defines a bypass duct. A fan inlet guide vane case is upstream of the fan blades and a fan exit guide vane case mounted downstream of the fan blades. The drive shaft is mounted on at least one input drive shaft bearing inwardly of the fan inlet guide vane case. The drive shaft drives a flexible coupling to in turn drive a gear reduction. The gear reduction drives a fan drive shaft to in turn drive the fan hub. At least two fan drive shaft bearings support the fan drive shaft and are mounted within the fan exit guide vane case.

Although embodiments have been disclosed, a worker of skill in this art would recognize that modifications would come within the scope of this disclosure. For that reason, the following claims should be studied to determine the true scope and content of this disclosure.

What is claimed is:

1. A gas turbine engine comprising:
a compressor section, a combustor and a turbine section defining a core engine, a fan drive turbine driving a drive shaft, said compressor section and said turbine section rotating about a rotational axis, with said turbine section positioned in a downstream direction relative to said compressor section;
a fan having fan blades and a fan hub positioned radially within a fan case, with the fan case defining a bypass duct;
a fan inlet guide vane case upstream of the fan blades and a fan exit guide vane case mounted downstream of the fan blades;
said drive shaft being mounted on at least one input drive shaft bearing inwardly of the fan inlet guide vane case, said drive shaft driving a flexible coupling to in turn drive a gear reduction, the gear reduction driving a fan drive shaft to in turn drive the fan hub;
at least two fan drive shaft bearings supporting the fan drive shaft and mounted within the fan exit guide vane case;
wherein there is an upstream fairing positioned forward of the fan inlet guide vane case; and
wherein the upstream fairing is fixed to the fan inlet guide vane case and has a curved outer surface to guide air outwardly of the upstream fairing and approaching the fan inlet guide vane case.

2. The gas turbine engine as set forth in claim 1, wherein there is a static inner fairing intermediate the fan inlet guide vane case and the fan hub.

3. The gas turbine engine as set forth in claim 1, wherein said gear reduction is mounted aft of the fan drive shaft.

4. The gas turbine engine as set forth in claim 3, wherein drive shaft oil seals are positioned within the fan inlet guide vane case on each axial side of the at least one input drive shaft bearing.

5. The gas turbine engine as set forth in claim 4, wherein a fan shaft oil seal is positioned between the fan drive shaft and the flexible coupling.

6. An aircraft comprising:
an aircraft body mounting at least two gas turbine engines;
each of said gas turbine engines having a compressor section, a combustor and a turbine section defining a core engine, and a fan drive turbine driving a drive shaft, said compressor section and said turbine section rotating about a rotational axis, with said turbine section positioned in a downstream direction relative to said compressor section;
a fan having fan blades and a fan hub positioned radially within a fan case, with the fan case defining a bypass duct;
a fan inlet guide vane case upstream of the fan blades and a fan exit guide vane case mounted downstream of the fan blades;
said drive shaft being mounted on at least one input drive shaft bearing inwardly of the fan inlet guide vane case, said drive shaft driving a flexible coupling to in turn drive a gear reduction, the gear reduction driving a fan drive shaft to in turn drive the fan hub;
at least two fan drive shaft bearings supporting the fan drive shaft and mounted within the fan exit guide vane case; and
wherein an upstream fairing is fixed to the fan inlet guide vane case and has a curved outer surface to guide air outwardly of the upstream fairing and approaching the fan inlet guide vane case.

7. The aircraft as set forth in claim 6, wherein said gear reduction is mounted aft of the fan drive shaft.

8. The aircraft as set forth in claim 7, wherein drive shaft oil seals are positioned within the fan inlet guide vane case on each axial side of the at least one input drive shaft bearing, and a fan shaft oil seal is positioned between the fan drive shaft and the flexible coupling.

9. The aircraft as set forth in claim 6, wherein the fan drive shaft is mounted radially outwardly of the flexible coupling.

10. The aircraft as set forth in claim 6, wherein the aircraft has a pair of wings and one of said gas turbine engines is mounted vertically above each of said wings.

11. The aircraft as set forth in claim 6, wherein the aircraft has a pair of wings with struts extending from a central fuselage to an underside of the wings, and one of said gas turbine engines is mounted beneath each of the wings.

12. The aircraft as set forth in claim 6, wherein the aircraft has a central fuselage with wings merging outwardly of the central fuselage and there being a plurality of said gas turbine engines mounted in each of two lateral sides of said central fuselage.

13. The aircraft as set forth in claim 12, wherein said fan drive turbines are positioned forward of the fans in the gas turbine engines.

14. The aircraft as set forth in claim 6, wherein said fan drive turbine is spaced axially from said core engine and separate from said core engine.

\* \* \* \* \*